3,519,615
QUATERNIZED AZO DYESTUFFS CONTAINING TRIAZOLIUM PHENYL GROUPS
Gerhard Wolfrum, Opladen, and Heinrich Gold, Cologne-Stammheim, Germany, assignors to Farbenfabriken Bayer Aktiengesellschaft, Leverkusen, Germany, a corporation of Germany
No Drawing. Filed July 12, 1966, Ser. No. 564,531
Claims priority, application Germany, July 17, 1965, F 46,643
Int. Cl. C09b 29/08, 29/28, 23/36
U.S. Cl. 260—155
10 Claims

ABSTRACT OF THE DISCLOSURE

Diazo components such as 1-(aminophenyl)-triazoles-(1,2,3) and their nonionic substitution products and quaternary salts are diazotised and coupled to produce azo dyestuffs which are adapted for use in dyeing fibers and fabrics of polyacrylonitrile, copolymers of acrylonitrile and dicyanoethylene, cellulosic fibers, silk, and leather, which dyestuffs correspond to the formula:

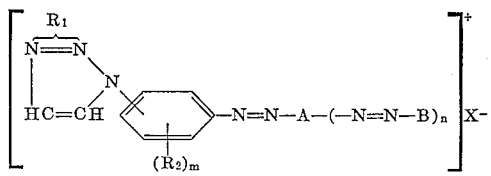

wherein A and B stand for a residue of a coupling component, $R_1$ stands for an alkyl radical with 1–4 carbon atoms or for benzyl, $R_2$ stands for a nonionic substituent, $m$ is 0–3, $n$ is 0 or 1, and X is an anion.

The present invention relates to valuable new azo dyestuffs which are free from sulphonic acid groups and correspond to the general formula

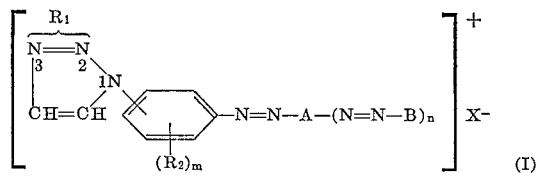

In the above formula $R_1$ denotes an alkyl radical with 1–4 carbon atoms or a benzyl radical, $R_2$ stands for a nonionic substituent, A and B are the radicals of coupling components, $m$ is the number 0, 1 or 2, $n$ is the number 0 or 1, and $X^-$ is an anion.

It has not yet clearly been proved whether the alkyl radical or the benzyl radical $R_1$ stands in the 2- or 3-position of the triazole ring of the dyestuffs of the general Formula I. With the greatest probability the radical $R_1$ is present at the 3-positioned nitrogen atom of the triazole ring.

Of the non-ionic substituents $R_2$, the following should be mentioned in particular, halogen, alkyl, trifluoroalkyl, alkoxy and thioether radicals, the alkyl radicals containing 1–4 carbon atoms.

The radicals of the coupling components A and B are preferably those of the 5-pyrazolone, 5-aminopyrazolone, phenol, aminobenzene, naphthol or aminonaphthalene series, as well as other radicals of the heterocyclic series, especially of the quinoline series. The cationic dyestuff radical is, by definition, free from sulphonic acid groups.

The new azo dyestuffs are prepared in such a way that the diazonium compound of an amine of the formula

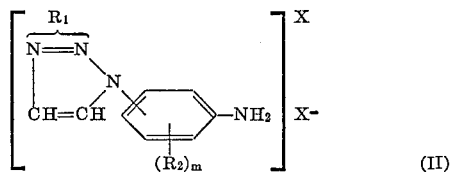

wherein $R_1$, $R_2$, $m$ and $X^-$ have the same meaning as above, is combined with a coupling component, optionally further diazotised and again coupled with an azo component, selecting the starting components free from sulphonic acid groups.

The dyestuffs according to the invention may also be produced in such a manner that azo dyestuffs of the general formula

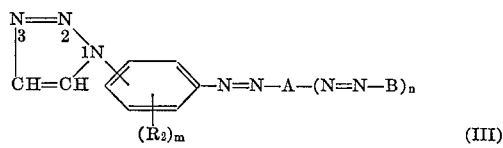

wherein $R_2$, A, B, $m$ and $n$ have the same meaning as above, are treated with alkylating agents $R_1X$, while quaternising the 2- or 3-positioned nitrogen atom of the triazole ring.

Diazo components suitable according to the present process are 1-(aminophenyl)-triazoles-(1,2,3) and their non-ionic substitution products as well as their quaternary salts. These compounds can be produced by reacting nitrophenylazides with acetylene to 1-(nitrophenyl)-triazoles-(1,2,3) and reducing these to the amines. From the amines there are obtained by acetylation and subsequent alkylation the quaternary salts which are converted into the amines of the Formula II by hydrolysis with mineral acids. Alkylating agents which may be used for this purpose are the following, for example, methyl chloride, methyl bromide, methyl iodide, benzyl chloride, trimethyloxonium-borofluoride, dimethyl sulphate, diethyl sulphate and p-toluene-sulphonic acid methyl, -ethyl, or -butyl esters. When the 1-(acetylaminophenyl)-triazoles-(1,2,3) are alkylated, it is most probable that the alkyl radical becomes attached to the nitrogen atom 3 of the triazole ring.

The diazotisation of the diazo component (II) is effected according to known methods, for example in an aqueous, mineral acid solution with sodium nitrite.

Suitable diazo components are the following, for example:

1-(4'-aminophenyl)-triazole-(1,2,3),
1-(3'-aminophenyl)-triazole-(1,2,3),
1-(3'-chloro-4'-aminophenyl)-triazole-(1,2,3),
1-(3'-methyl-4'-aminophenyl)-triazole-(1,2,3),
1-(2'-methyl-4'-aminophenyl)-triazole-(1,2,3),
1-(2'-chloro-4'-aminophenyl)-triazole-(1,2,3),
1-(3'-methoxy-4'-aminophenyl)-triazole-(1,2,3),
1-(3'-methylthio-4'-aminophenyl)-triazole-(1,2,3),
1-(2'-methoxy-4'-aminophenyl)-triazole-(1,2,3),
1-(2'-methylthio-4'-aminophenyl)-triazole-(1,2,3),
1-(3'-propyl-4'-aminophenyl)-triazole-(1,2,4),
1-(2',5'-dimethyl-4'-aminophenyl)-triazole-(1,2,4),
1-(2',5'-dichloro-4'-aminophenyl)-triazole-(1,2,3), 1-(2'-methyl-5'-methoxy-4'-aminophenyl)-triazole-(1,2,3),
1-(3'-ethoxy-4'-aminophenyl)-triazole-(1,2,3),
1-(4'-chloro-3'-aminophenyl)-triazole-(1,2,3),
1-(4'-ethyl-3-aminophenyl)-triazole-(1,2,3),
1-(4'-propoxy-3'-aminophenyl)-triazole-(1,2,3),
1-(3'-chloro-5'-aminophenyl)-triazole-(1,2,3),
1-(3'-ethyl-5'-aminophenyl)-triazole-(1,2,3),
1-(3',5'-dichloro-4'-aminophenyl)-triazole-(1,2,3) and the quaternary salts of these compounds which most probably carry the alkyl or benzyl group at the nitrogen atom 3 of the triazole ring, for example as the fundamental types of the two compounds of the formula

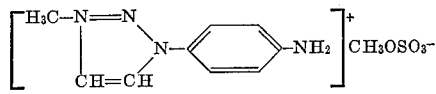

and

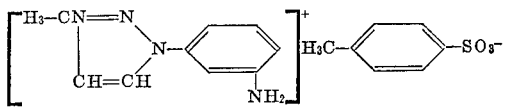

Suitable coupling components A-(NH₂)ₙ or B are the following, for example: 1-phenyl-3 - methyl-pyrazolone-(5), 1-(β-cyanoethyl) - 3 - methyl-pyrazolone-(5), 1-(β-hydroxyethyl)-3 - methyl-pyrazolone - (5), 1,3-diphenyl-pyrazolone-(5), 2 - methylpyrazolo[2,3-a]benzimidazole, 2-methylpyrazolo[3,2-b]quinazolone, phenol, p-cresol, m-cresol, 3-chlorophenol, aniline, o-toluidine, m-toluidine, 3-chloro-aniline, 3-anisidine, 2-anisidine, 1-amino-3-methyl-6-methoxy-benzene, 1-amino-2,5-dimethoxybenzene, N,N-dimethylaniline, N,N-diethylaniline, N-ethyl-N-β-cyano-ethylaniline, N,N-bis-(β-cyanoethyl)-aniline, N,N-bis-(β-hydroxyethyl)-aniline, N-methyl-diphenylamine, naphthol-(2), naphthol-(1), 1-amino-naphthol-(5), 1,3-dihydroxy-isoquinoline, 2-methyl-indole, 1-ethyl-1,2,3,4 - tetrahydro-quinoline, 1,2,3,4 - tetrahydro-quinoline-propionic acid (1)-ethyl ester, 1,2,3,4 - tetrahydro-3-hydroxy-benzo[h]-quinoline, 1,2,3,4 - tetrahydro-3,7-dihydroxy-benzo[h]-quinoline.

Preferred coupling components are as follows: wherein A stands for the residue of a coupling component selected from a group consisting of (a) aminophenyl which is unsubstituted in the phenyl radical, or is substituted in the phenyl radical by at least one member selected from the group consisting of methyl, ethyl, bromo, chloro, methoxy, ethoxy, acetyl-amino, methylmercapto, and ethylmercapto, and which is unsubstituted at the N atom or is substituted at the N atom by at least one member selected from the group consisting of lower alkyl, phenyl, hydroxyethyl, cyano-ethyl, and benzyl;

(b) hydroxyphenyl which is unsubstituted or is substituted by at least one member selected from the group consisting of methyl and chloro;

(c) hydroxynaphthalene which is unsubstituted or is substituted by an amino group;

(d) pyrazolon-(5)-yl which is substituted with at least one member selected from the group consisting of methyl, phenyl, cyanoethyl, and hydroxyethyl;

(e) 2-methyl-pyrazolo[2,3-a]benzimidazolyl;
(f) 2-methyl-pyrazolo[3,2-b]quinazolyl;
(g) 2-methyl-indolyl;
(h) 1,3-dihydroxy-isoquinolyl;
(i) tetrahydrobenzoquinolyl substituted by at least one hydroxy group;
(j) tetrahydroquinolyl which contains at the N atom a substituent selected from the group consisting of ethyl and ethoxycarbonylethoxy radicals;

and wherein B is selected from (a) as defined above.

The coupling of the starting components is effected in known manner, for example in a neutral, acidic or weakly alkaline, aqueous medium.

If the dyestuffs according to the invention are prepared by alkylation of the dyestuffs of the general Formula III, then the alkylation is expediently carried out by heating in an inert organic solvent, e.g. in hydrocarbons, such as benzene, toluene or xylene; halohydrocarbons, such as carbon tetrachloride, ethane tetrachloride, chloro-benzene, o-dichlorobenzene; nitrohydrocarbons, such as nitrobenzene or nitronaphthalene, or in dimethyl formamide, acetonitrile or dimethyl sulphoxide with the use of preferably equivalent amounts of alkylating agents, for example with methyl chloride, methyl bromide, methyl iodide, ethyl bromide, benzyl chloride, trimethyl-oxo-nium-borofluoride, dimethyl sulphate, diethyl sulphate, p-toluene-sulphonic acid methyl, -ethyl or -butyl ester. In the case where the starting dyestuffs also contain other quaternisable groups than the triazole ring, it may be advantageous to use larger than equivalent amounts of alkylating agents.

The resulting quaternised dyestuffs are hardly soluble in the solvents employed and can be isolated by filtration. If the quaternised dyestuffs are dissolved, partly or completely, when using dimethyl formamide, dimethyl sulphoxide or acetonitrile, then they can be separated by dilution with water or by the addition of water-soluble salts, for example sodium or potassium chloride.

The dyestuffs of the Formula I prepared by coupling the diazonium compounds of amines of the Formula II with the stated coupling components, as well as the dyestuffs of the Formula I produced by alkylation of the dyestuffs of the Formula III can be purified by dissolving in water and separation by the addition of water-soluble salts, for example sodium or potassium chloride.

The dyestuffs obtained according to the process of the invention contain the anionic radical X⁻ which is preferably the radical of a strong acid, for example of sulphuric acid or its semi-esters or of an arylsulphonic acid, or an halogen ion. These anions may, however, also be replaced by the radicals of other acids, for example of phosphoric acid, hydrofluoboric acid, formic acid, acetic acid, tartaric acid or lactic acid. The dyestuff salts may also be converted into double salts by means of inorganic salts, for example with zinc chloride. The anions X may thus be, for instance, Cl⁻, Br⁻, $CH_3SO_4^-$, $C_2H_5SO_4^-$, p-toluen-sulphonate, benzene sulphonate, phosphate, acetate, formiate, oxalate, lactate, propionate, maleinate, tartrate, $NO_2^-$, perchlorate and chloro zincate. It is to be understood, that the anion X does not affect the tincturial applicability of the azo dyestuff and is substantially un-coloured as usual in cationic dyes.

The dyestuffs obtained according to the present process are eminently suitable for the dyeing and printing of fully synthetic fibres of polymers and copolymers of acrylo-nitrile and dicyanoethylene, whereby fast shades are obtained. The dyestuffs can also be used for the dyeing and printing of tannin-treated cellulose materials, silk and leather.

The following examples are given for the purpose of illustrating the invention. The parts are parts by weight. The quarternary substituent in the triazolium salt is throughout indicated in the 3-position of the triazolium ring, although this position could not be clearly established by experiment.

EXAMPLE 1

A solution of 28.6 parts 3-methyl-1-(4'-aminophenyl)-1,2,3-triazolium methosulphate of the formula

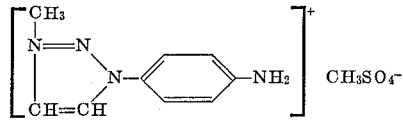

which is obtained by saponifying at 95–100° C. for 30 minutes 33 parts 3-methyl-1-(4'-acetylamino)-1,2,3-tri-azolium methosulphate in a mixture of 150 parts water and 30 parts concentrated hydrochloric acid, is diazotised at 0-3° C. with a solution of 6.9 parts sodium nitrile in 50 parts water. The clear diazonium salt solution is freed from a small excess of nitrous acid by means of amidosulphonic acid and then added to a solution of 17.4 parts N-ethyl-N-(β-cyanoethyl)-aniline in a mixture of 50 parts water and 25 parts concentrated hydrochloric acid. Coupling resulting in the monoazo dyestuff sets in immediately; it is completed by slowly adding a sodium acetate solution and, after completed coupling, the resulting dyestuff is completely precipitated by the addition of 50 parts sodium chloride. The dyestuff is then filtered off and dried. 45 parts of a red dyestuff powder are obtained which readily dissolves in water with an orange colour. The dyestuff probably corresponds to the formula

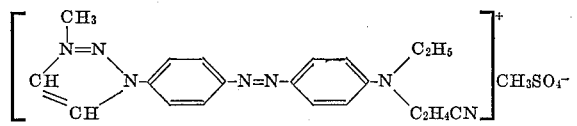

and dyes fibres and fabrics of polyacrylonitrile from an acidic solution in yellowish orange shades. The dyeings possess very good fastness to wet processing and good fastness to light.

The 3-methyl - 1 - (4'-acetylaminophenyl)-1,2,3-triazolium methosulphate was prepared as follows: p-nitrophenylazide is reacted in an acetone solution at 100° C., in an autoclave, with acetylene to give 1-(4'-nitrophenyl)-1,2,3-triazole (M.P. 208-210° C.), the latter is reduced to 1-(4'-aminophenyl)-1,2,3-triazole (M.P. 139-140° C.) with iron hydrochloric acid in water and the amino compound acetylated with acetic anhydride in an aqueous suspension to give 1-(4'-acetylaminophenyl)-1,2,3-triazole (M.P. 206-207° C.). By reacting the acetylamino compound with dimethyl sulphate in chlorobenzene at 100-120° C., the 3 - methyl - 1 - (4'-acetylaminophenyl)-1,2,3-triazolium methosulphate (M.P. 222-223° C.) is obtained.

With the coupling components set out in the following table, the diazo component of Example 1 also yields valuable, water-soluble azo dyestuffs which dye polyacrylonitrile fibres in the specified shades:

| Example | Coupling component | Shade on polyacrylonitrile |
|---|---|---|
| 2 | N,N-dimethylaniline | Orange. |
| 3 | N-methyl-N-cyanoethylaniline | Strongly yellowish orange. |
| 4 | 3-methyl-N,N-dimethylaniline | Orange. |
| 5 | 3-chloro-N,N-dimethylaniline | Yellowish orange. |
| 6 | N-methyl-N-phenylaniline | Do. |

EXAMPLE 7

The diazonium salt solution prepared according to Example 1 is added at 0-10° C. to a solution of 10.7 parts 3-methylaniline in 50 parts water and 10 parts concentrated hydrochloric acid and the coupling which sets in immediately is completed by adjusting the pH value to 4-5 by means of sodium acetate. The dyestuff is precipitated by the addition of 30 parts sodium chloride and filtered off. It is a yellow-brown powder. This powder is dissolved in 300 parts water, mixed with 25 parts concentrated hydrochloric acid and diazotised at 3-8° C. with a solution of 6.9 parts sodium nitrile in 50 parts water. The clear diazonium salt solution is freed from an excess of nitrous acid by means of amidosulphonic acid and then added to a solution of 18.3 parts N-methyl-N-phenylaniline in 50 parts water and 15 parts concentrated hydrochloric acid. The coupling to the diazo dyestuff, which starts immediately, is completed by the addition of sodium acetate; after completion of the coupling, the dyestuff is precipitated by the addition of 40 parts sodium chloride and finally filtered off. The dyestuff thus formed has probably the constitution

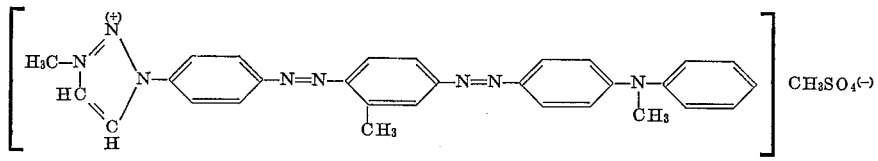

and dyes textile articles made of polyacrylonitrile in a brownish red shade with very good fastness to wet processing and very good fastness to light.

EXAMPLE 8

When the diazonium salt solution prepared according to Example 1 is added to a finely divided dispersion of 17.4 parts 1-phenyl-3-methyl-pyrazolone-(5) in 250 parts water and the pH value of the mixture is maintained at 6-7, a yellow dyestuff is obtained which is isolated in usual manner by filtration. This dyestuff which is obtained in a yield of 42.6 parts, dyes textile materials of polyacrylonitrile in yellow shades. The dyeings possess very good fastness to wet processing and very good fastness to light.

EXAMPLE 9

The diazonium salt solution prepared according to Example 1 is added to a solution of 15.9 parts 1-amino-5-hydroxy-naphthalene in 300 parts water and 20 parts concentrated hydrochloric acid. The immediately starting coupling is completed, without buffering, in a medium which reacts acid to Congo and the resultant dyestuff is precipitated by the addition of 40 parts sodium chloride. The dyestuff is isolated by filtration. After drying, 43.2 parts of the dyestuff are obtained.

The dyestuff has the probable constitution

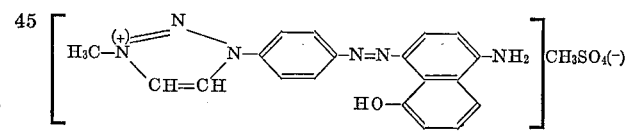

and dyes textile articles made of polyacrylonitrile in bluish Bordeaux shades. Besides good fastness to wet processing, the dyeings have a very good fastness to light.

EXAMPLE 10

If in Example 9 there is used as coupling component, instead of 1-amino - 5 - hydroxy-naphthalene, 21.5 parts 1,2,3,4 - tetrahydro - 3,7 - dihydroxy-benzo[h]quinoline, then 48.7 parts of a blue dyestuff powder are obtained which dyes textile materials of polyacrylonitrile in violet shades. The dyestuff has the probable constitution

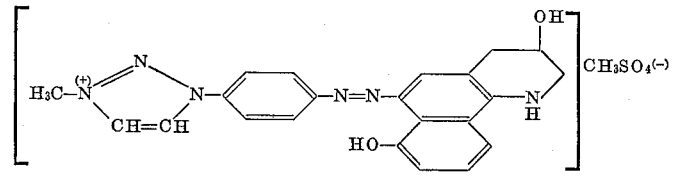

The dyeings are very fast to wet processing and to light.

EXAMPLE 11

19.5 parts 1 - (3' - chloro - 4' - aminophenyl)-triazole-(1,2,3) are dissolved in 100 parts water containing 25 parts concentrated hydrochloric acid and the solution is diazotised at 0-3° C. with a solution of 6.9 parts sodium nitrite in 40 parts water. After removal of a possibly present excess of nitrous acid with amidosulphonic acid, the clear diazonium salt solution is added to a solution of 13.5 parts 3-methyl-N,N-dimethylaniline in 100 parts water and 10 parts concentrated hydrochloric acid. The coupling resulting in the monoazo dyestuff sets in immediately and is completed by buffering by means of sodium acetate. The resultant dyestuff is filtered off and washed. After drying, 31.7 parts are obtained. The dyestuff has the formula

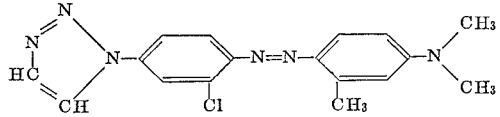

and is completely insoluble in water.

17 parts of the above dyestuff are heated to 100° C. in 200 parts 1,2-dichlorobenzene and mixed with portions of 6.3 parts dimethyl sulphate. Stirring is continued at 120° C. for a further 2 hours. After cooling, the dyestuff is filtered off, washed with benzene and dried. 22.6 parts of a readily water-soluble powder are obtained which dissolves with an orange-red colour. The dyestuff has the probable constitution

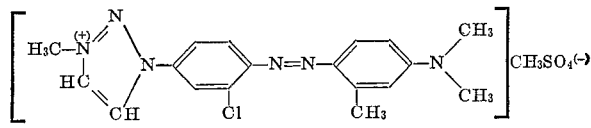

and dyes textile materials of polyacrylonitrile in yellowish red shades of good fastness to wet processing and light.

The 1-(3'-chloro-4'-aminophenyl)-triazole-(1,2,3) of M.P. 87° C., used in this example as diazo component was prepared from 3-chloro-4-nitroaniline by conversion into 3-chloro-4-nitrophenyl-azide and reaction of this azide in an acetone solution at 100° C., in an autoclave, with acetylene to give the 1-(3'-chloro-4'-nitrophenyl)-triazole-(1,2,3) of M.P. 135° C. This nitro compound was finally reduced with iron or by catalysis to the amine.

EXAMPLE 12

A solution of 31.9 parts 3-methyl-1-(3'-chloro-4'-aminophenyl)-(1,2,3)-triazolium methosulphate, prepared by hydrolysis of 36.1 parts 3-methyl-1-(3'-chloro-4'-acetylaminophenyl)-(1,2,3)-triazolium methosulphate in a mixture of 150 parts water and 30 parts concentrated hydrochloric acid at 95–100° C. for 30 minutes, is diazotised at 0–3° C. with a solution of 6.9 parts sodium nitrite in 50 parts water, and the clear diazonium salt solution is added, after removal of a small excess of nitrous acid by means of amidosulphonic acid, to a solution of 13.5 parts 3-methyl-N,N-dimethylaniline in 100 parts water and 10 parts concentrated hydrochloric acid. The coupling resulting in the monoazo dyestuff is completed by the addition of sodium acetate. The resulting dyestuff is precipitated by the addition of 40 parts sodium chloride and filtered off. After drying, there are obtained 42.9 parts of a red powder which readily dissolves in water with an orange-red colour. The dyestuff has the probable constitution

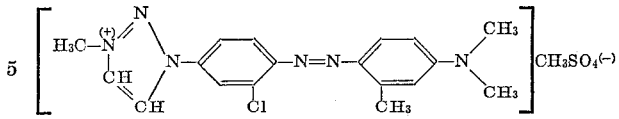

and is identical with the dyestuff of Example 11 obtained in a different way. The dyestuff dyes textile articles made of polyacrylonitrile in yellowish red shades of good fastness to wet processing and to light.

The diazo component of Example 12 also yields with the coupling components set out in the following table valuable, water-soluble azo dyestuffs which dye polyacrylonitrile fibres in the specified shades:

| Example | Coupling component | Shade on polyacrylonitrile |
|---|---|---|
| 13 | N,N-diethylaniline | Strongly reddish orange. |
| 14 | N-ethyl-N-cyanoethylaniline | Reddish orange. |
| 15 | 3-chloro-N,N-diethylaniline | Red. |
| 16 | N-methyl-N-phenylaniline | Yellowish red. |
| 17 | N,N-dihydroxy-ethylaniline | Reddish orange. |
| 18 | 1-amino-5-hydroxynaphthalene | Strongly bluish Bordeaux. |
| 19 | 1,2,3,4-tetrahydro-3,7-dihydroxy-benzo[h]quinoline | Violet. |
| 20 | 1-phenyl-3-methyl-pyrazolone-5 | Yellow. |
| 21 | 1-β-cyanoethyl-3-methyl-pyrazolone-5 | Do. |
| 22 | 2-methyl-indole | Reddish yellow. |
| 23 | 2-methylpyrazolo[2,3-a]benzimidazole. | Yellow. |

EXAMPLE 24

The diazonium salt solution prepared according to Example 12 is added at 0–10° C. to a solution of 10.7 parts 3-methylaniline in 50 parts water and 10 parts concentrated hydrochloric acid, and the immediately starting coupling is completed by the addition of sodium acetate up to a pH value of 4–5. The dyestuff is precipitated by the addition of sodium chloride and filtered off. It is an orange coloured powder which is dissolved in 300 parts water and 25 parts concentrated hydrochloric acid and diazotised at 3–8° C. with a solution of 6.9 parts sodium nitrite in 50 parts water. After removal of a small excess of nitrous acid by means of amidosulphonic acid, the diazonium salt solution is added to a solution of 18.3 parts N-methyl-N-phenylaniline in 50 parts water and 15 parts concentrated hydrochloric acid. When the coupling at a weakly acidid pH value is completed, the precipitation of the dyestuff is completed by the addition of 40 parts sodium chloride. The dyestuff is filtered off and dried. It has the probable constitution

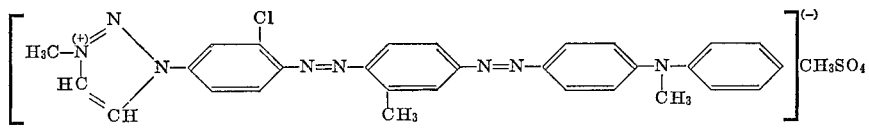

and dyes textile materials of polyacrylonitrile in red-brown shades of very good fastness to wet processing and very good fastness to light.

If in Example 24 there are used as intermediate component, instead of 10.7 parts 3-methylaniline, 12.3 parts 3-methoxy-aniline and as end component, exactly as in Example 23, 18.3 parts N-methyl-N-phenylaniline, then the diazo dyestuff of the following probable constitution is obtained:

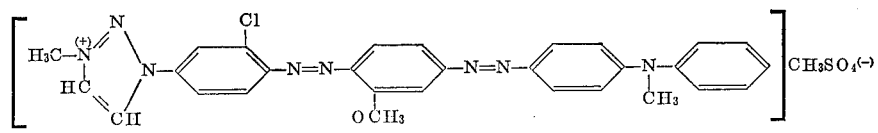

This dyestuff dyes polyacrylonitrile fibres in bluish garnet shades of very good fastness to wet processing and to light.

EXAMPLE 25

A solution of 28.6 parts 3-methyl-1-(3'-aminophenyl)-1,2,3 - triazolium methosulphate, obtained by hydrolysis of 33 parts 3 - methyl - 1 - (3'-acetylaminophenyl)-1,2,3-triazolium methosulphate in a mixture of 150 parts water and 30 parts concentrated hydrochloric acid at 95–100° C. for 30 minutes, is diazotised at 0–3° C. in the usual manner with a solution of 6.9 parts sodium nitrite in 50 parts water. The diazonium salt solution is added to a solution of 15.9 parts 1-amino-5-hydroxynaphthalene in 300 parts water and 20 parts concentrated hydrochloric acid. When the coupling is completed in a medium reacting acid to Congo, the resulting dyestuff is filtered off. After drying, 39.3 parts of this dyestuff are obtained in the form of a blue-black powder which readily dissolves in water. The dyestuff dyes polyacrylonitrile fibres from an aqueous solution in Bordeaux shades. The dyeings possess good fastness to wet processing and to light. The dyestuff has the probable formula.

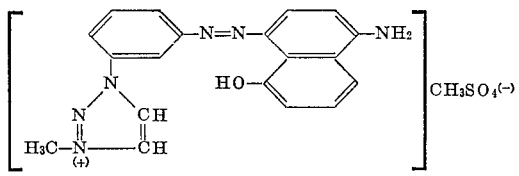

The 3 - methyl - (3' - acetylaminophenyl)-1,2,3-triazolium methosulphate (M.P. 257–259° C.) employed in this example was prepared by the reaction of 3- nitrophenylazide with acetylene at 100° C. in an acetone solution, reduction of the resulting 1 - (3' - nitro - phenyl)-triazole-(1,2,3) of M.P. 112–114° C. with iron to give the 1 - (3' - aminophenyl) - triazole-(1,2,3) of M.P. 121–123° C., acetylation to the 1 - (3' - acetylaminophenyl)-triazole-(1,2,3) of M.P. 175–176° C. and quaternisation of this acetylamino compound.

EXAMPLE 26

20.4 parts 1 - (3' - amino - 4'-ethoxyphenyl)-triazole-(1,2,3) of M.P. 121–122° C. are dissolved in 100 parts water and 25 parts concentrated hydrochloric acid and the solution is diazotised at 0–3° C. with a solution of 6.9 parts sodium nitrite in 40 parts water. The diazonium salt solution is added to a solution of 17.4 parts N-ethyl-N-β-cyanoethyl-aniline in 100 parts water and 10 parts concentrated hydrochloric acid. The coupling resulting in the monoazo dyestuff is completed by the addition of a sodium acetate solution and the dyestuff formed is isolated by filtration. After washing with water and drying 36.1 parts of this water-insoluble dyestuff are obtained in the form of an orange-brown powder.

19.5 parts of this dried dyestuff are heated to 100° C. in 250 parts 1,2-dichlorobenzene, and portions of 20.1 parts p-toluene-sulphonic acid ethyl ester are then added at the same temperature. The reaction mixture is then further stirred at 120–130° C. for 2–3 hours. After cooling, the precipitated dyestuff is filtered off and the dyestuff is washed with benzene twice or three times. The dyestuff which is then water-soluble is, after drying, a red-brown powder; it has the probable formula

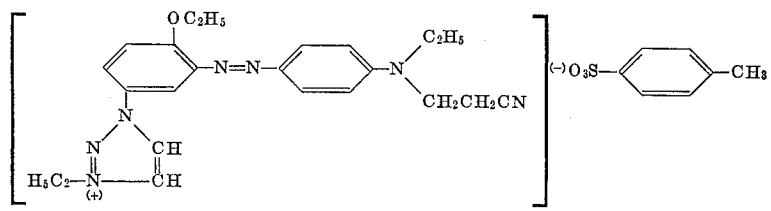

and dyes polyacrylonitrile fibres from an aqueous bath in red-orange shades.

EXAMPLE 27

The solution of 30 parts of 3-methyl-1-(3'-methyl-4'-aminophenyl)-1,2,3-triazolium methosulphate of the formula

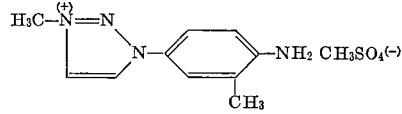

which was obtained by saponification of 34.2 parts of 3-methyl-1-(3'-methyl-4'-acetylaminophenyl) - 1,2,3 - triazolium methosulphate in a mixture of 150 parts of water and 30 parts of concentrated hydrochloric acid at 95 to 100° C. during 30 minutes, is diazotised at 0 to 3° C. with a solution of 6.9 parts of sodium nitrite in 50 parts of water and the clear diazonium salt solution after removal of excess nitric acid by means of amido sulphonic acid added to a solution of 17.9 parts of 3-methyl-N,N-ethyl-β-hydroxyethyl-aniline in 100 parts of water and 10 parts of concentrated hydrochloric acid. The coupling and formation of the monoazo dyestuff is completed by the addition of sodium acetate. The dyestuff thus formed can be precipitated by means of 40 parts of rock salt and filtered. After drying one obtains 50.8 parts of a red powder which dissolves in water with red-orange colour. The dyestuff corresponds to the formula

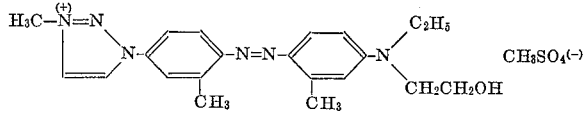

It dyes polyacrylonitrile fabrics yellowish red shades with very good wet and light fastness properties.

If in this example the diazo component is replaced by the equivalent amount of the diazo components listed in the following table valuable water-soluble dyestuffs are likewise obtainable which dye polyacrylonitrile fabrics in shades given below:

| Example | Coupling component % | Shade on polyacrylonitrile |
|---|---|---|
| 28 | N,N-diethylaniline | Reddish orange. |
| 29 | 3-methyl-N,N-bis-β-hydroxyethylaniline. | Do. |
| 30 | 3-methyl-N,N-diethylaniline | Do. |
| 31 | N-methyl-diphenylamine | Do. |
| 32 | 3-methyl-N-ethyl-N-benzyl-aniline. | Strong reddish orange. |
| 33 | 3-acetylamino-N,N-diethyl-aniline. | Yellowish red. |

EXAMPLE 34

A diazonium salt solution prepared in accordance with the method given in Example 12 is added at 0 to 5° C. to a solution of 17.9 parts of 3-methyl-N,N-ethyl-β-cyano-ethylaniline in 100 parts of water and 10 parts of concentrated hydrochloric acid. The coupling and formation of the monoazo dyestuff is completed by buffering the reaction medium with sodium acetate. The dyestuff thus formed is salted out, filtered with suction and dried. One obtains 43.7 parts of the dyestuff of the following constitution:

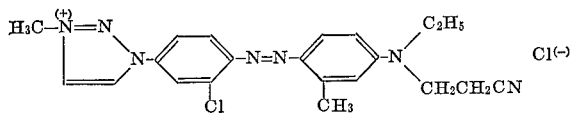

It dyes polyacrylonitrile fabrics strongly yellowish red shades with good fastness to light and to wet processing.

If in this example the diazo component is replaced by the equivalent amount of the diazo components listed in the following table valuable water-soluble azo dyestuffs are likewise obtained which dye polyacrylonitrile fabrics in the shades given below:

| Example | Coupling component % | Shade on polyacrylonitrile |
|---|---|---|
| 35 | 3-methyl-N,N-ethyl-β-hydroxy-ethylaniline. | Red. |
| 36 | 3-methyl-N,N-bis-β-hydroxy-ethylaniline. | Yellowish red. |
| 37 | 3-methyl-N,N-ethylbenzylaniline. | Strong yellowish red. |
| 38 | 3-acetylamino-N,N-diethylaniline. | Red. |
| 39 | 1,2,3,4-tetrahydro-3,7-dihydroxy-benzo[h]quinoline. | Blue-violet. |

We claim:
1. An azo dyestuff of the formula

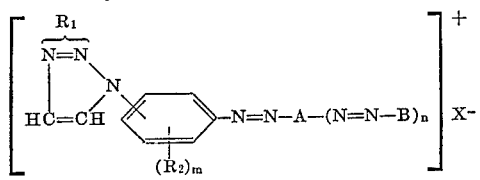

wherein A stands for the residue of a coupling component selected from a group consisting of
 (a) aminophenyl which is unsubstituted in the phenyl radical, or is substituted in the phenyl radical by at least one member selected from the group consisting of methyl, ethyl, bromo, chloro, methoxy, ethoxy, acetylamino, methylmercapto, and ethylmercapto, and which is unsubstituted at the N atom or is substituted at the N atom by at least one member selected from the group consisting of lower alkyl, phenyl, hydroxyethyl, cyanoethyl, and benzyl;
 (b) hydroxyphenyl which is unsubstituted or is substituted by at least one member selected from the group consisting of methyl and chloro;
 (c) hydroxynaphthalene which is unsubstituted or is substituted by an amino group;
 (d) pyrazolon-(5)-yl which is substituted with at least one member selected from the group consisting of methyl, phenyl, cyanoethyl, and hydroxyethyl;
 (e) 2-methyl-pyrazolo[2,3-a]benzimidazolyl;
 (f) 2-methyl-pyrazolo[3,2-b]quinazolyl;
 (g) 2-methyl-indolyl;
 (h) 1,3-dihydroxy-isoquinolyl;
 (i) tetrahydrobenzoquinolyl substituted by at least one hydroxy group;
 (j) tetrahydroquinolyl which contains at the N atom a substituent selected from the group consisting of ethyl and ethoxycarbonylethoxy radicals;

and wherein B is selected from (a) as defined above; wherein n is 0 or 1 and m is 0, 1 or 2; $R_1$ stands for alkyl containing 1 to 4 carbon atoms or benzyl; $R_2$ stands for a non-ionic substituent selected from the group consisting of hydrogen, alkyl of 1 to 4 carbon atoms, halogen atoms, trifluoroalkyl of 1 to 4 carbon atoms, alkoxy of 1 to 4 carbon atoms, or alkylthioether of 1 to 4 carbon atoms; and X stands for an anion, said dyestuff being free of sulfonic acid groups.

2. An azo dyestuff of claim 1 of the formula

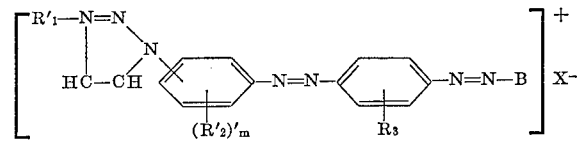

wherein $R'_1$ stands for $CH_3$ or $C_2H_5$, $R'_2$ stands for Cl or methoxy or ethoxy, $R_3$ stands for hydrogen, Cl, Br, $CH_3$, $C_2H_5$, $CH_3O$, $C_2H_5O$, $CH_3S$ or $C_2H_5S$, $m'$ strands for the number 0 or 1, B stands for the residue of a coupling component consisting of an aminobenzene radical (a) of claim 1 and X stands for an anion.

3. A dyestuff of claim 1 of the formula

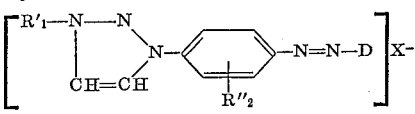

wherein $R'_1$ stands for $CH_3$ or $C_2H_5$, $R''_2$ stands for hydrogen or D stands for one of the residues

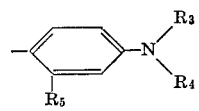

or 1-phenyl-3-methyl-5-pyrazolone bound to the azo group in 4-position or

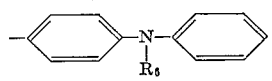

or

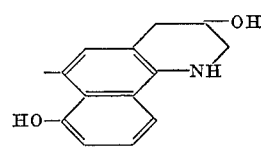

$R_3$ stands for lower alkyl or hydroxy lower alkyl, $R_4$ stands for lower alkyl, hydroxy lower alkyl or cyano lower alkyl, $R_5$ stands for hydrogen, methyl or acetyl amino, $R_6$ stands for lower alkyl and X is an anion.

4. A dyestuff of claim 1 of the formula

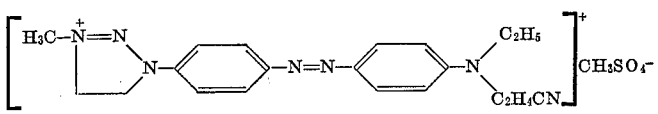

5. A dyestuff of claim 1 of the formula

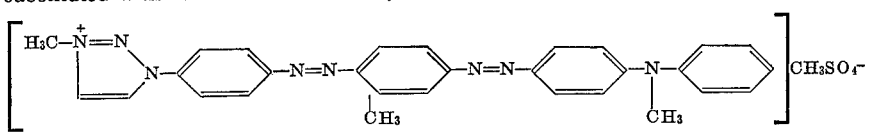

6. A dyestuff of claim 1 of the formula

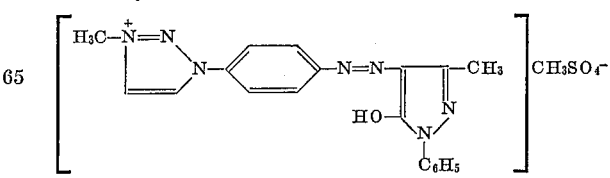

7 A dyestuff of claim 1 of the formula

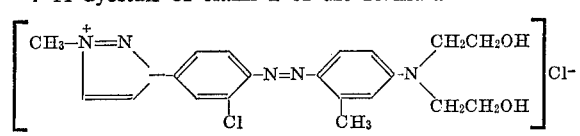

8. A dyestuff of claim 1 of the formula
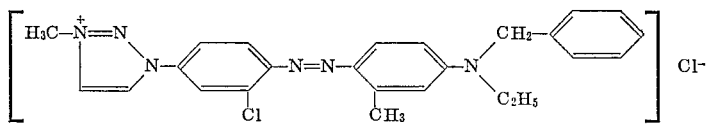
9. A dyestuff of claim 1 of the formula
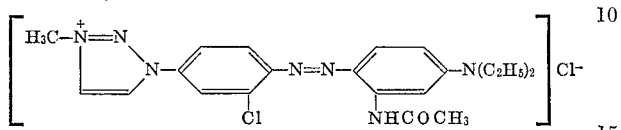
10. A dyestuff of claim 1 of the formula
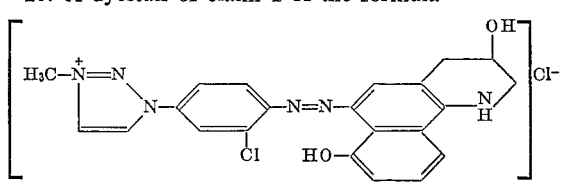
References Cited
UNITED STATES PATENTS
2,848,447   8/1958   Kracker et al. _____ 260—157
3,102,787   9/1963   Baumann et al. __ 260—153 XR
3,148,179   9/1964   Carboni _____ 260—157
FLOYD D. HIGEL, Primary Examiner
U.S. Cl. X.R.
8—13, 41, 50, 63, 71; 260—157, 162, 146, 308